July 26, 1938.  H. C. KNERR ET AL  2,124,579
METHOD OF AND APPARATUS FOR TESTING METALLIC ARTICLES
Filed Jan. 30, 1937   6 Sheets-Sheet 1
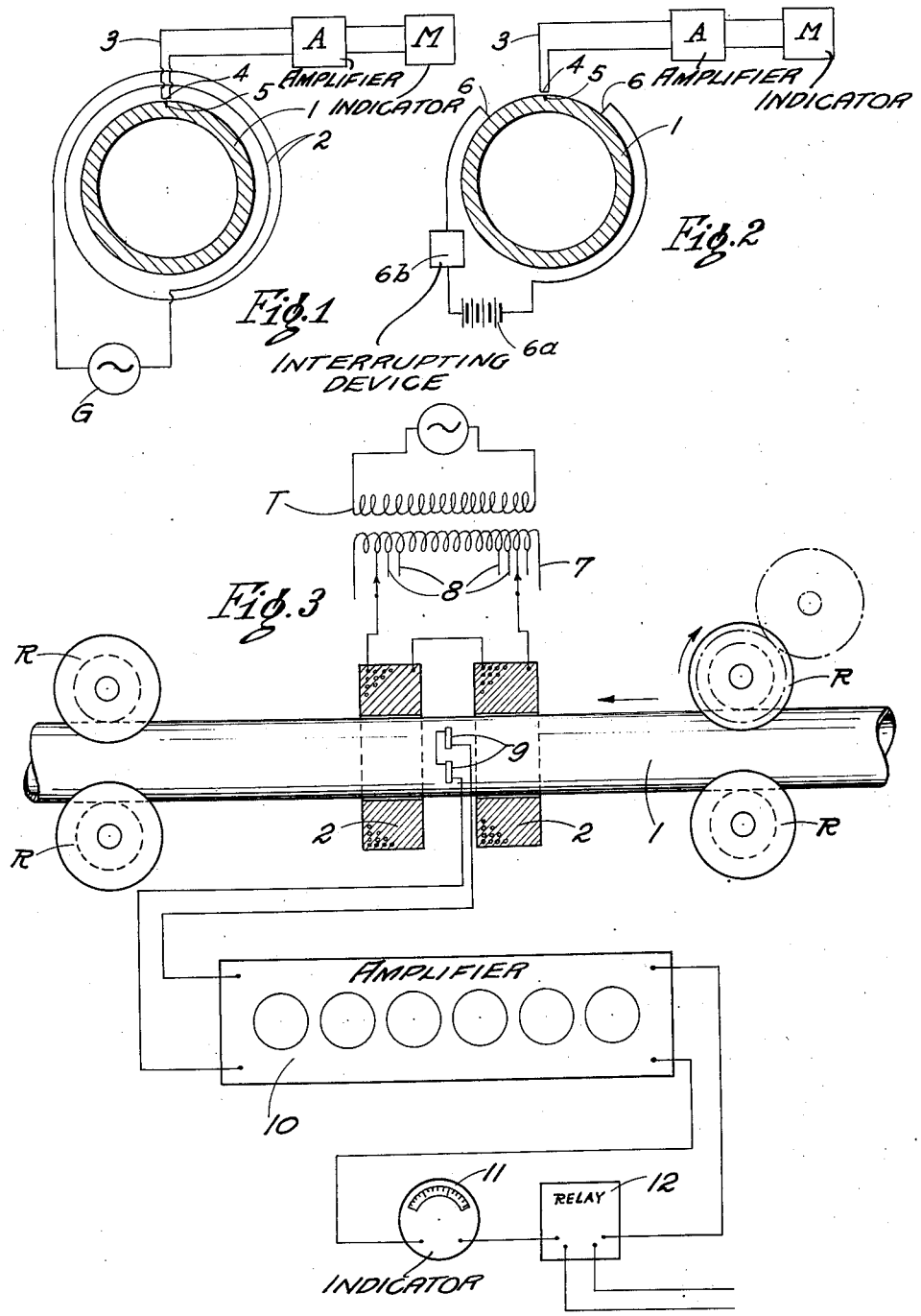
INVENTORS
HORACE C. KNERR
& ALFRED R. SHARPLES
BY
ATTORNEYS

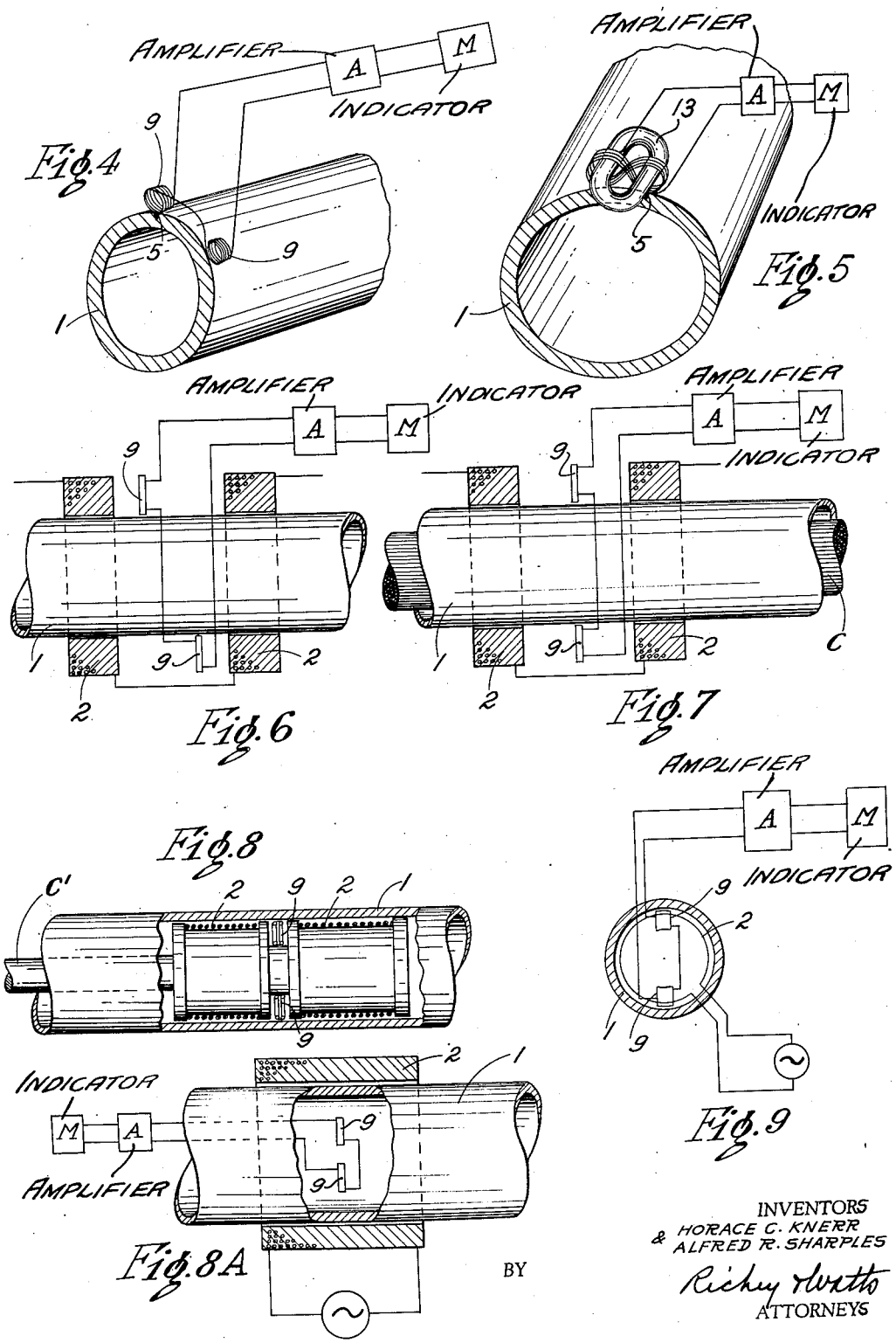

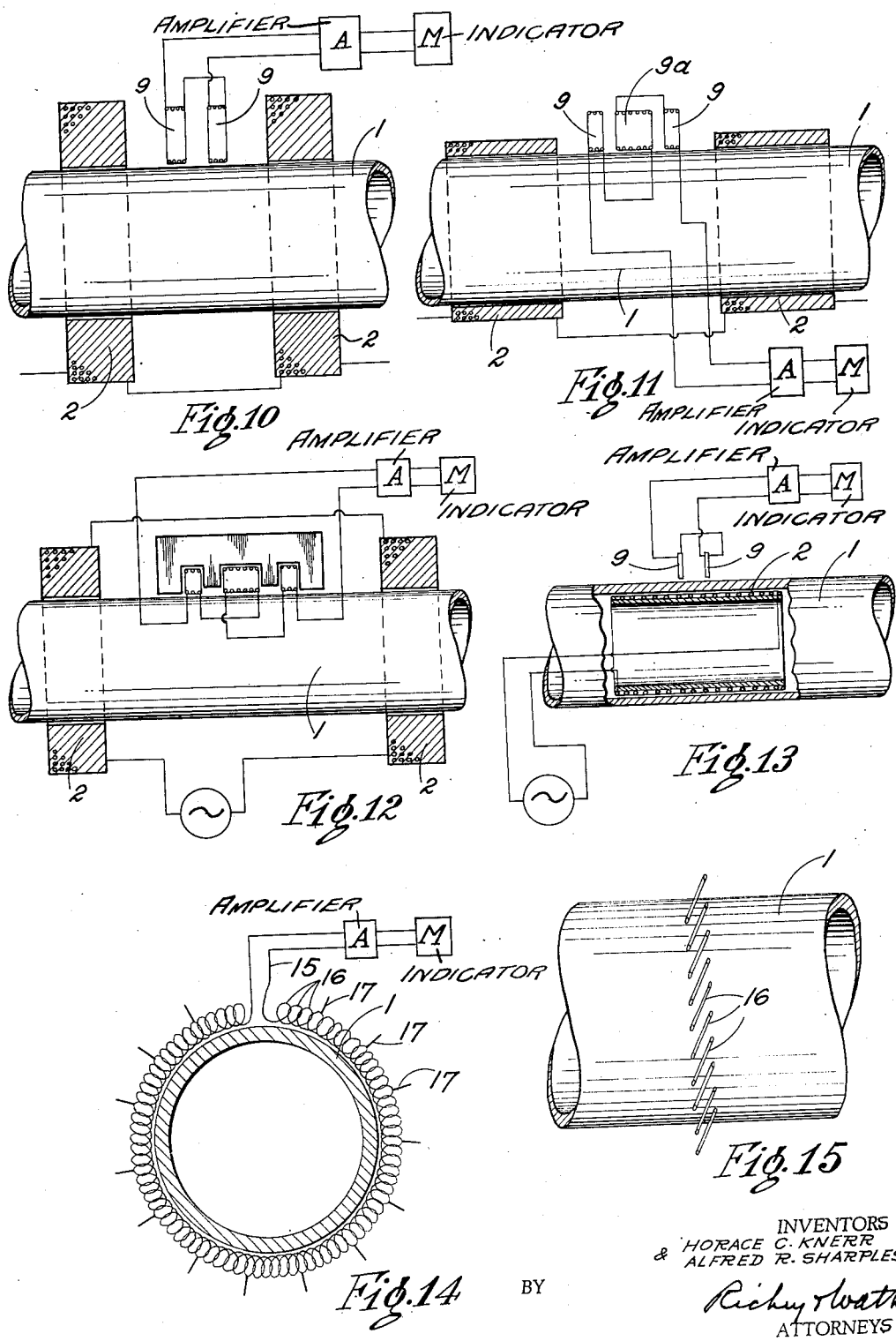

July 26, 1938. H. C. KNERR ET AL 2,124,579
METHOD OF AND APPARATUS FOR TESTING METALLIC ARTICLES
Filed Jan. 30, 1937 6 Sheets-Sheet 4

INVENTORS
HORACE C. KNERR
& ALFRED R. SHARPLES
BY
Richey & Watts
ATTORNEYS

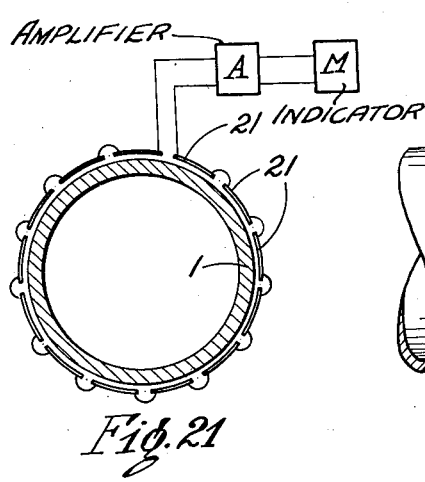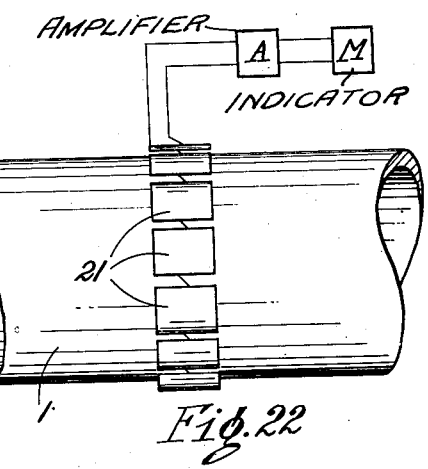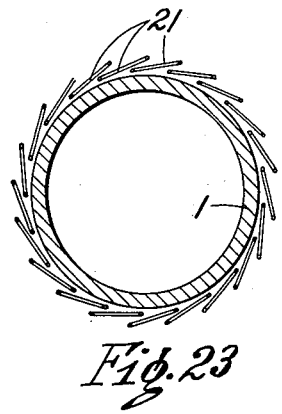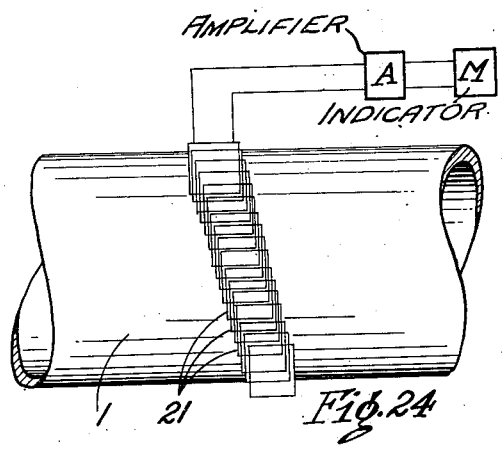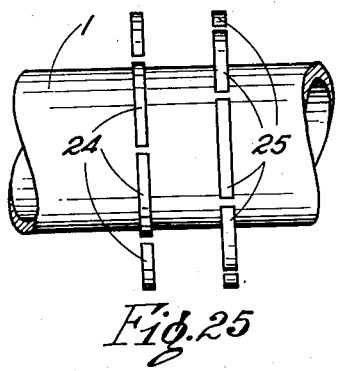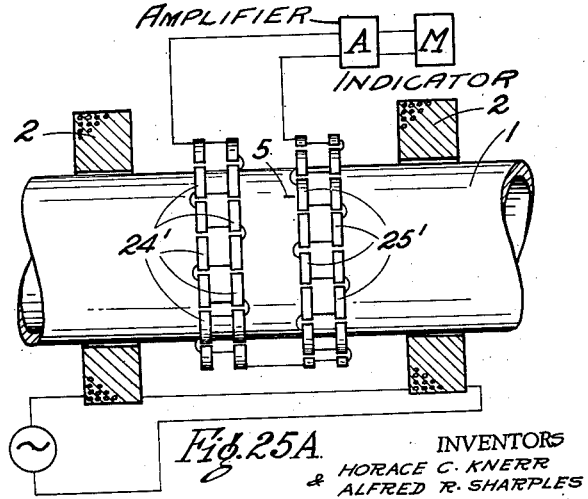

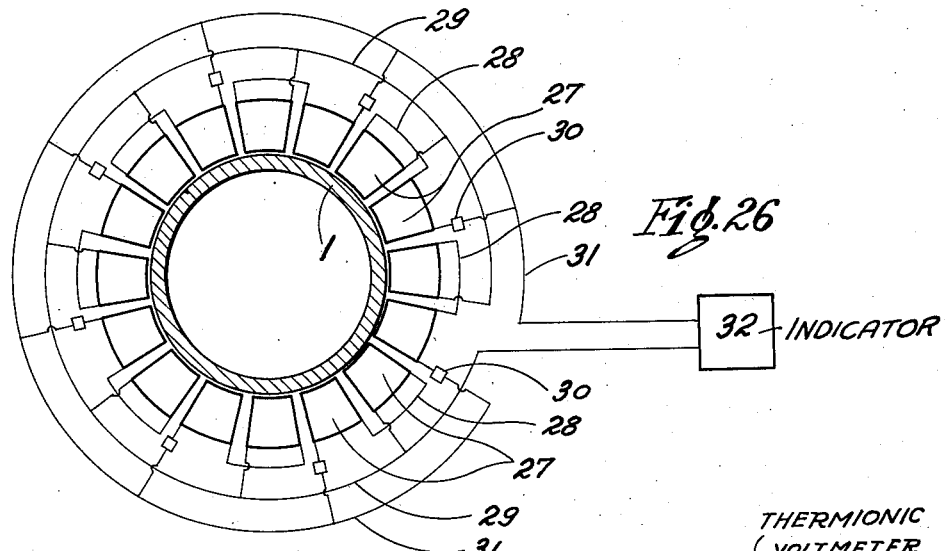
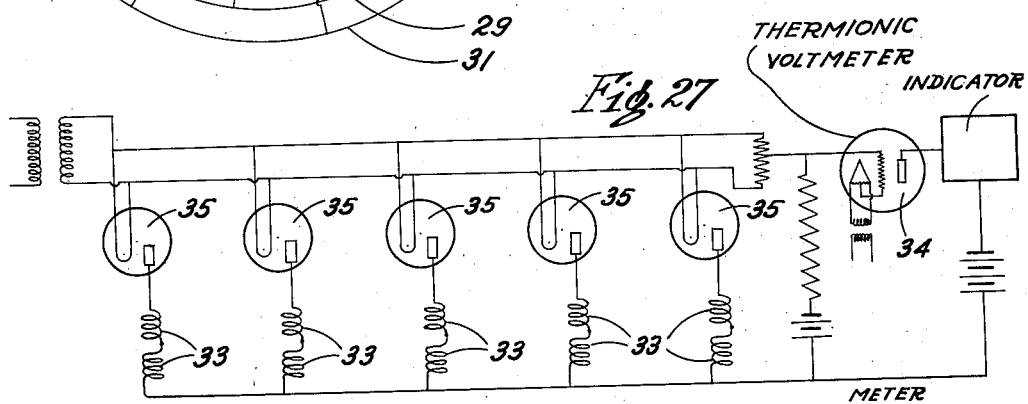
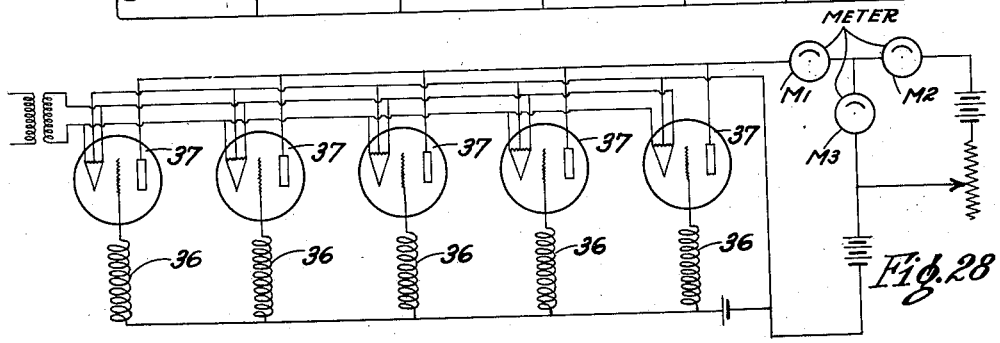
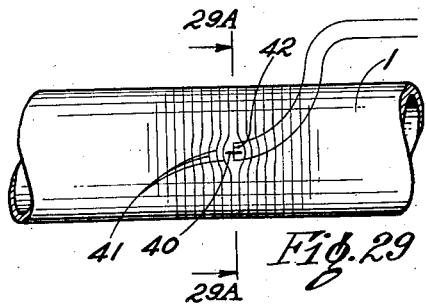
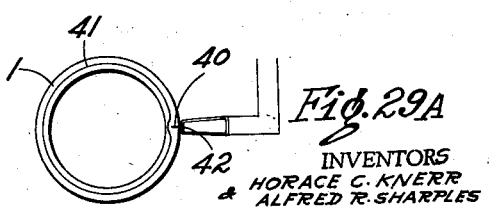

Patented July 26, 1938

2,124,579

UNITED STATES PATENT OFFICE

2,124,579

METHOD OF AND APPARATUS FOR TESTING METALLIC ARTICLES

Horace C. Knerr, Philadelphia, and Alfred R. Sharples, Drexel Hill, Pa., assignors, by direct and mesne assignments, to Steel and Tubes, Inc., Cleveland, Ohio, a corporation of Ohio Application January 30, 1937, Serial No. 123,256

24 Claims. (Cl. 175—183)

This invention relates generally to the art of electrically testing metal articles for defects and flaws and more particularly to new and improved methods and means for detecting and locating flaws or defects in metal articles such as tubing, rods and the like, which flaws or defects are of small dimensional size.

This invention may be considered as an improvement on the inventions disclosed in copending United States patent applications Serial Nos. 589,887 and 627,798.

In application Serial No. 589,887, flaws or defects in metal articles, such as rods, bars or tubing, are detected by the steps of causing current to flow circumferentially of the article and detecting the presence of a defect by observing the affect of the defect on current induced in a conductor surrounding the article. When the flaw is short and extends longitudinally of the article it offers resistance to the flow of current circumferentially in the article and causes a deflection of such current from its normal path into paths which curve around the ends of the flaw, or under the defect if the latter is located close to the surface. Such distortion of these paths results in a slight increase in their circumferential lengths with a corresponding slight increase in the total resistance of the paths.

The invention of application Serial No. 589,887 possesses certain important commercial advantages but also possesses certain disadvantages. For example, the detection of flaws by the method of said application depends, in part, on the average circumferential properties of the tube section under test, such as resistance, and certain magnetic properties of the article. Since a small flaw causes only a small variation in the average circumferential resistance of the article section under test, the signal effect due to such a flaw is not exceptionally strong in an article of small diameter and becomes weaker as the diameter of the article increases.

In application Serial No. 627,798 short longitudinal flaws or defects are detected in part by causing current to flow circumferentially in the article in the part thereof which is to be tested and observing the variations in the potential drop between contactors engaging the surface of the article at circumferentially spaced points on opposite sides of a defect. The invention of that application possesses many advantages, but also certain disadvantages. Among these disadvantages are the wear of the contactors which necessitates frequent replacement thereof, the presence of scale or dirt on the article which causes unreliable connections between the contactors and article, the effect of slight variations in the setting of the true points of contact which may result in false signals, the delicacy of the contact mechanism which renders it subject to mechanical damage or derangement, the tendency of the contactors to pick up dirt or other foreign matter from the article, thus clogging or interfering with the detector mechanism, and the necessity of keeping the defect between the contact points.

The present invention avoids many of, if not all, the foregoing disadvantages of the inventions of applications Serial Nos. 589,887 and 627,798, while retaining their several advantages and possessing other additional new and important advantages.

When current flows in a metal article at right angles to a flaw it is deflected by the flaw and the current flow is reduced in the part of the article immediately adjacent to and on opposite sides of the flaw in the normal current path. When the flaw is small, the part of the article in which such variations are greatest is also quite small. Its surface is approximately as long as the flaw but is of greater width.

The present invention is based on the discovery of new and improved methods and means by which such a part of the article can be examined inductively and independently of all other parts of the article. Thus, this invention makes it possible to obtain detecting signals of maximum strength and selectivity. In other words, the present invention, in effect, discards all but a small part of the article in contrast to the method of application Serial No. 589,887 where the full circumferential length is included, and relies on induction in contrast to the actual contact and direct conduction of application Serial No. 627,798.

The present invention possesses the advantages of speed and certainty in detection which were possessed by the foregoing inventions and additional and important advantages including the producing of signals of maximum strength and great sensitivity to very small defects; immunity to variations in other parts of the article in wall thickness and resistance, temperature or other physical, magnetic or electrical properties; freedom from mechanical difficulties traceable to contactors; and the possibility of complete examination of every small part of the article, selectively if desired, which makes it unnecessary to position the suspected defect containing part of the article in any particular location with respect to the detecting device.

The method of the present invention includes the steps of causing current to flow in the article approximately at a right angle to the flaw or defect and inductively observing the variation in, or deflection or deviation of, the current in the small part of the article containing the flaw or defect. The apparatus of the present invention includes means to cause a current to flow at approximately a right angle to the flaw or defect and a conductor having a short length or section closely coupled inductively to the article, such section being disposed substantially at a right angle to the flaw or defect and being substantially parallel to the normal path of current in the article. For best results the said short section of the conductor should be about as long as the defect and its width should be less than the length of the defect.

Generally speaking, many variations may be made in the method and apparatus described briefly above. For example, the current flowing in the article may be direct pulsating current supplied directly to the article from a suitable source through suitable contactors, or it may be current induced by alternating current (of any desired frequency) flowing around the article in a conductor. Also, for example, the detector conductor may include one or more turns constituting a coil and one or more of such coils may be used. Such coils may be spaced from each other either circumferentially or lengthwise of the article. Also, two or more of such coils may be spaced circumferentially and two or more may be spaced axially of the article. Likewise, a sufficient number of circumferentially disposed coils may be employed to encircle the article and two or more of such sets of coils may be spaced axially of the article. Also when two coils are connected together they preferably oppose each other. The means for causing current to flow in the article may be such as will cause current to flow either circumferentially or axially of the article and may be located inside the article, if hollow or tubular, as well as outside of it. Similarly, the detecting coil or coils may be located inside of a hollow or tubular article. The article may be magnetically saturated or not, as desired, and the detecting coils may be shielded or not, as desired.

The foregoing and other variations will be described in more detail hereinafter.

In the drawings accompanying and forming a part of this specification, and in which several different devices embodying and for use in practicing the present invention are shown, Figure 1 shows diagrammatically a simple form of our apparatus for testing articles for defects, the illustrated article being a tube.

Figure 2 shows diagrammatically a slight modification of the apparatus of Figure 1 in which pulsating direct current is passed through the article.

Figure 3 shows apparatus for testing tubing, including two circumferentially spaced detector coils.

Figure 4 shows diagrammatically the winding and arrangement of the detector coils of Figure 3.

Figure 5 shows diagrammatically a modified form of the construction of the coils of Figure 4.

Figures 6 and 7 show diagrammatically modifications of the location and connection of the detector coils of Figure 3.

Figures 8 and 9 show diagrammatically a modification of Figure 3, where in the energizing and detecting coils are both located within the article, and Figure 8A shows detector coils within and the energizing coil outside the article.

Figures 10, 11, 12 and 13 illustrate diagrammatically various arrangements of axially spaced detector coils.

Figures 14, 15, 16, 17 and 18 show diagrammatically further modified forms and arrangements of detector coils.

Figure 19 shows diagrammatically the hook-up of the coils of Figure 18.

Figures 20, 21, 22, 23, 24, 25 and 25A show other forms and arrangements of detector coils.

Figure 26 illustrates a plurality of series-opposed coils associated with bi-contact rectifiers.

Figures 27 and 28 show diagrammatically hook-ups for several detector coils including electrical one-way valves associated therewith.

Figures 29 and 29A are diagrammatic illustrations showing how the current path is distorted adjacent a flaw.

Figure 16:
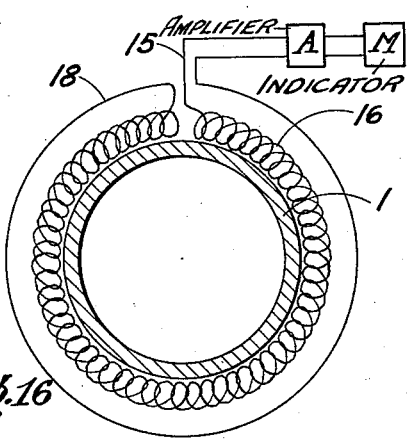

In Figure 1 the article 1 to be tested is encircled by a conductor coil 2 connected to a source of alternating current G. The detector circuit includes an amplifier A and an indicator M, such as a meter or galvanometer or other suitable indicating or recording apparatus and a conductor 3. This conductor 3 consists of a non-inductive part and an inductive part 4 which is located closely adjacent to the surface of artitcle 1 and is positioned in closely coupled relation to the part of article 1 in which a defect 5 is located. Part 4 extends at right angles to the direction of extent of defect 5 and parallel to the normal path of current in the article. Part 4 is preferably about as short as defect 5 and narrower than the length of the defect 5.

In Figure 2 the article 1 is supplied with direct pulsating current from any suitable source, illustrated as a battery 6a and current interrupting device 6b, through contactors 6 between which the part 4 of the detector circuit, shown and described in conjunction with Figure 1, is located.

The operation of the apparatus of Figures 1 and 2 is substantially as follows:—Alternating or pulsating current is caused to flow circumferentially in the article 1 at right angles to defect 5 by induction from the current flowing in the conductor 2, or by the pulsating direct current entering the article through contactors 6. Such alternating or pulsating current induces an E. M. F. in the detector circuit and such induced E. M. F. is varied when a flaw 5 comes to a position closely adjacent to part 4 of the conductor 3. This variation may be amplified in amplifier A and indicated in indicator M.

Referring to Figure 3, 1 indicates the article being tested and 2 the energizing coils surrounding the same, which coils are connected to the secondary 7 of transformer T. The coils 2 are connected in series and may be adjusted so that current of the proper magnitude will flow through them by suitably selecting the taps 8 of the transformer to which they are connected. The detector circuit includes two circumferentially spaced coils 9 connected in series and having their windings opposed, a detector amplifier 10, an indicator 11 in the form of a meter, and a relay 12 which may be used, if desired, to operate a signal or marking device. The detector coils 9 are spaced from each other circumferentially of the article 1 and both coils have inductive parts, as above described, positioned in closely coupled relation to the article 1. Feed rolls R driven by any suitable means (not shown), are adapted to move the tube or other article 1 through the testing apparatus, thus progressively testing different parts of the article.

When energizing current flows in coils 2, it induces a flow of current circumferentially of the tubular article 1 and the current flowing in the article in turn induces E. M. F. in each coil 9. When no defect is present closely adjacent to either coil 9, the E. M. F. in the two coils 9 is equal and opposite and hence no current flows to the amplifying and indicating devices, but when a defect comes closely adjacent to the inductive part of either of these coils 9 the current flowing in the article is reduced in or diverted from the locality of the defect, thus changing the E. M. F. induced in the inductive part of coil 9 adjacent the defect, with the result that the E. M. F. induced in the other coil 9 is of a different magnitude and hence current flows in the amplifier and indicator circuit. In other words, the presence of a defect adjacent to the inductive part of one of the coils 9 results in an unbalance of the opposed E. M. F.'s of the two coils 9 and the resulting current is amplified and rendered observable by the amplifier-detector unit 10 and the indicator 11.

The coils 9 of Figure 3 are shown diagrammatically in Figure 4 and each consists of one or more turns about an axis which is substantially parallel to the longitudinal axis of article 1. Alternatively these coils 9 may be wound according to the manner illustrated diagrammatically in Figure 5 where the wire is looped in the form of a figure 8 with their axes parallel to the axis of article 1. The core 13 may be omitted if desired.

In Figures 6 and 7 the coils 9 are disposed about 180° apart and are connected respectively in series and in opposed relation. In Figure 6 the coils are staggered axially of the article 1 while in Figure 7 they are aligned on opposite sides of the article. The magnetizable core C of Figure 7, which may be of wire as illustrated or laminated or slotted for reduction of losses, is added to increase the electrical efficiency of the apparatus. This may be especially desirable in testing non-magnetic material.

In Figures 8 and 9, both the energizing coils 2 of Figure 3 and the detector coils 9 of Figure 3 are located within the article 1, in contrast to the showing in Figure 3, and the coils 9 are spaced about 180° apart after the manner shown in Figure 7. A supporting core or mandrel C' supports the coils 2 and 9 in proper position within the tube. The mandrel of Figure 8 may be composed of either magnetic or non-magnetic material depending upon whether or not it is desired to increase the flow of current in the article, and may be used even when the coils are outside of the article.

In Figure 8A two coils 9 are shown located within the article and spaced circumferentially from each other and the energizing coil 2 is located outside of the article.

In Figure 10 two detector coils 9 are spaced axially of the article 1 and are connected in opposed relation.

In Figure 11 two coils 9 are spaced axially of the article 1 and are connected to a coil 9a disposed therebetween, the coils 9 being connected in series and opposed to coil 9a, the latter having twice as many turns as each of the coils 9. When no defect is present, no current will flow in the detector circuit, because the two coils 9 are opposed to 9a, but when a defect comes adjacent to either coil 9 it will result in an unbalance of the coil and current will flow in the detector circuit. This arrangement has merit in the selective detection of certain types of flaws relative to longitudinal variations of a harmless nature in the article.

In Figure 12 the coils 9 and 9a of Figure 11 are shown provided with a shield 14 which may be composed of suitable material such as laminated iron, copper or the like. The use of a shield of laminated iron tends to increase the inductive linkage between the three detector coils and has other desirable effects. The use of copper tends to act as a shield against stray flux by the generation of opposed induced current in the copper.

In Figure 13 the coils 9 are located exteriorly of the article as in Figure 3, while the energizing coils 2 of Figure 3 have been combined into one coil located within the article.

In Figures 14 and 15 is shown a modified form of detector coil. This coil 15 consist of a plurality of turns 16 substantially surrounding article 1 and having a plurality of taps 17. This coil 15 may be crushed axially so that the turns will take the form of a flattened spiral, as shown in Figure 15. The flattening of this coil brings the inductive part of each turn into a position roughly at right angles to the longitudinal axis of the defect to be detected. By means of a suitable switch (not shown) making connection to the taps 17 each part of the coil between two taps 17 may be connected with the amplifier and indicator. In this manner the entire circumferential length of the article may be tested in small parts independently of all other parts. Alternatively, the loops 16 between each pair of taps 17 may be connected to a detector circuit. In other words, there may be as many detector circuits as there are pairs of taps 17.

In Figure 16 is shown a coil 15, similar to that of Figures 14 and 15, but with one end thereof looped back around the loops 16 to form a turn 18, and whose inductance relative to the periphery of the article is equal and opposed to that of the series of loops 16. The coil of Figure 16 is preferably crushed to form a flattened spiral, as shown in Figure 15. This single turn will provide an inductance equal and opposed to the spiral, each being considered as a single turn in the same plane, and thus neutralize the induced voltage. A small defect adjacent to the inductive part of any turn or loop 16 will upset the existing state of balance and current will flow in amplifier and indicator.

Figure 17:
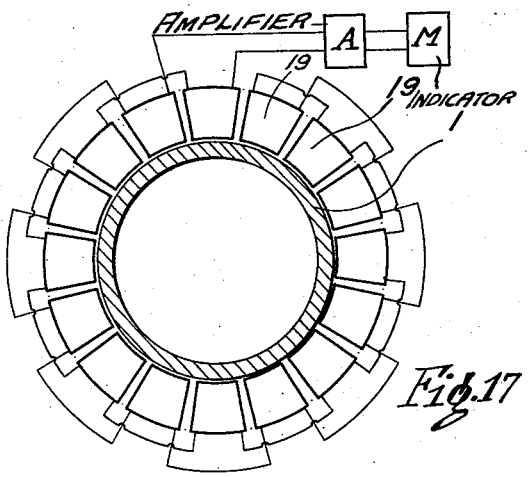

In Figure 17 the detector coils are spaced circumferentially of the article and each coil 19 is formed with radial sides, as indicated. These coils are alternately connected in series opposed and all lie in the same plane transversely of the article. The system of interconnecting wires shown between coils renders the connections relatively non-inductive. It will be understood that the coils of this figure, as well as those of the other figures, are not necessarily drawn to scale. In actual practice of our invention the inductive portion of the detector coils are frequently very short, in some cases being only about ⅛ inch long. Circumferential coil length has been referred to as small, and about the length of a flaw. While this is probably the optimum value, when it is realized that flaws less than $\tfrac{1}{16}$ inch long can be reliably detected by means of coil having an inductive part two or three times this value, it is evident that considerable leeway exists in the detector coil dimensions. It is important, for maximum sensitivity, to limit the inductive portion of the coil to that area which is most greatly affected by deflection of current away from the region immediately adjacent to the flaw.

Figures 18, 19:
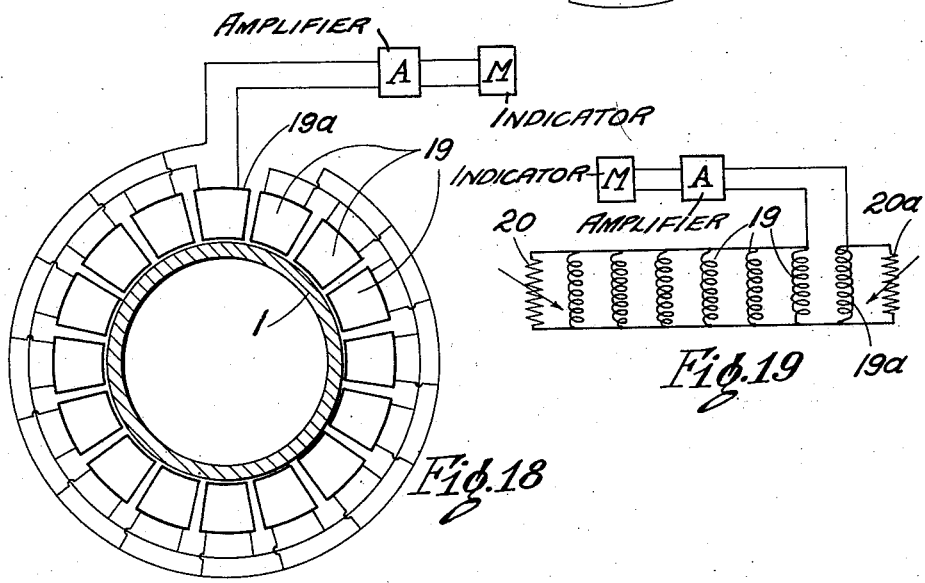

In Figures 18 and 19 the coils 19 of Figure 17 are connected in parallel in the detector circuit and are connected in series opposed to a single similar coil 19a. By means of resistances 20 and 20a (see Fig. 19) the single coil 19a can be balanced against the parallel connected coils 19, as shown diagrammatically in Figure 19.

Figure 20:
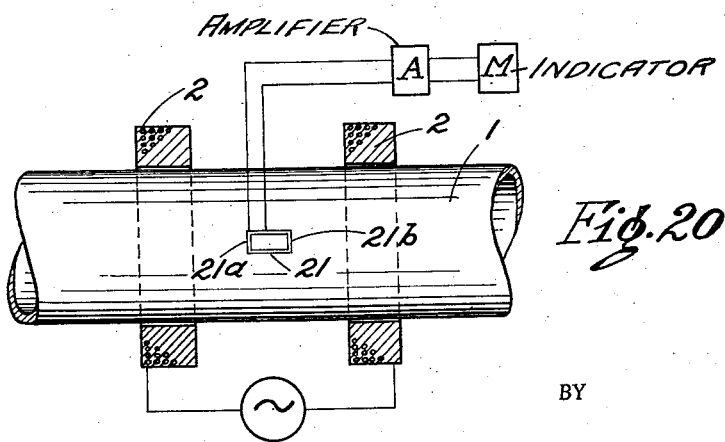

In Figure 20 the coil 21 is generally rectangular in shape but, unlike the coils of the preceding figure, this coil 21 has an axis disposed at right angles to the surface of the article. This coil 21 has two inductive parts 21a and 21b, whereas conductor 3 of Figure 1 had only one inductive part 4. These parts 21a and 21b act like the inductive part 4 of two opposed coils whose axes are parallel to the axis of the article, for example, as shown in Figure 10.

Figures 21 and 22 show a plurality of coils 21 connected in series and constituting a bracelet-like assembly encircling the article. Obviously these coils may be selectively opposed in series, as is indicated in Figure 18, for example.

In Figures 23 and 24, coils 21 are made by looping a conductor into rectangular loops and then radially flattening and axially displacing these loops into the form shown in these figures.

When coils 21 of Figures 20 to 24, inclusive, are used, and symmetrically located in the flux path, no current will flow in the coils so long as no defect is present in the vicinity of the inductive part of any of such coils, but as soon as a defect comes into such vicinity, an E. M. F. will be induced therein which may be amplified and detected by means such as devices 10 and 11 of Figure 2.

It will be understood from the disclosure of preceding figures that one or more coils 21 which may be termed "flat coils" to distinguish them from the radially arranged coils 9 and modifications thereof, may be spaced from each other circumferentially or axially relative to the article, and located either on the inside or the outside of the article.

Figure 25 illustrates an arrangement of detector coils somewhat similar to that shown in Figures 17 and 18 but in which the coils 24 and 25 are arranged in axially spaced groups, each group extending circumferentially around the tube 1. In this arrangement the coils 25 are circumferentially staggered in relation to the coils 24 so that the entire circumference of the article to be tested will be covered and the possibility is eliminated of a flaw passing through the space between two adjacent coils without being detected. All the coils may be connected in series or separate amplifiers may be used for each set or for each coil; parallel connections and a single indicating device may also be used.

Another arrangement is illustrated in Figure 25A. Here detector coils 24' form one set and are spaced in tandem axially of the article and arranged to completely surround it. A similar set of tandem coils 25' is circumferentially staggered relative to the first set. These may be connected with a single amplifier as illustrated in the drawings or with two or more amplifiers as noted above. Various methods of interconnection of the detector coils may be used as illustrated herein. This method has advantages in distinguishing flaws from certain types of harmless variations in the article.

In the carrying out of our method for detecting flaws it is desirable to secure the maximum response from a flaw developed voltage. Where a number of detector coils are connected in parallel the voltage developed in the detector coils by a flaw may be dissipated to a considerable extent by causing the current to flow through all the coils and thus a relatively small current will be available to actuate the indicating device. By use of a rectifying unit associated with each detector coil, or small group of detector coils, the induced current will be permitted to flow in only one direction through the coils and it cannot then flow from the excited detector coil, which is adjacent a flaw, through the parallel detector coil units and dissipation of the induced energy is thus avoided.

In Figures 26, 27 and 28 we have illustrated three arrangements by which the above noted dissipation of the induced current is prevented and a greater response may be obtained from the flaw developed voltage. In these circuits a unidirective path is provided by rectifying units which permit current induced in the detector coil or coils to flow in only one direction therein so that the flow developed voltage or voltage differential is not dissipated by causing a current flow through other parallel connected but non-active detector coils, and the rectified flaw induced voltage is available to actuate a signal device or other indicating system.

In Figure 26 the article to be tested is illustrated as a tube 1 in which a circumferentially flowing alternating or pulsating current may be set up in the manner previously described. A number of detector coils 27 are supported around the circumference of the tube in close proximity to each other and connected in pairs in series-opposed relation to conductors 28. One end of each pair of coils 27 is connected to a common conductor 29 and a rectifying unit 30 is inserted in the connection between the other coil 27 of each pair and the common conductor 31. The rectifying devices 30 may conveniently be of the bi-contact type such as copper-copper oxide film rectifiers.

When a flaw exists in the test article 1 under the inductive part of any one of the detector coils 27 the difference in the induced E. M. F. existing between the windings of the particular pair of detector coils 27 will be rectified by the element 30 and impressed upon the connecting conductors 29 and 31 and the passage of the induced current through the other coils 27 of the system will be opposed by the other rectifiers 30 which are associated with the other pairs of coils of the assembly. The indicating device 32 is then afforded the full value of the rectified voltage to indicate the presence of the defect. If desired an amplifying system may be inserted ahead of the indicator 32 to give a still further increase in signal strength.

In Figure 27 the connections are illustrated for a plurality of detector coils which may be suitably arranged relative to the article to be tested and with which two-element vacuum tubes, acting as unidirectional current valves, are employed. In this arrangement a defect induced increase in potential from any of the coils 33 will actuate the thermionic volt meter 34 without loss due to voltage diversion through the other coils because, due to the vacuum tube rectifiers 35, current cannot pass through in the opposite direction. When vacuum tube rectifiers are used with coil assemblies in this manner all vacuum tubes would commonly be operated at the same time, that is, be supplied with filament current and necessary operating voltages so that simultaneous tests would be obtained from all of the detector coils, and the entire circumference of the article inspected, rather than a progressive or step by step system of testing in which the different coils were independently connected to the indicating device.

In Figure 28 an arrangement is illustrated in which three-element type vacuum tubes are used in multiple connection as rectifiers to obtain the results described above. In this system variations in the voltage induced in any of the detector coils 36 will modify the plate current of its particular three-element tube 37 but will not affect the other coils of the tubes. For ease of observation variations of plate current may be observed on the meter $M_3$ as the difference between a normal value, shown on meter $M_2$, existing when no defects are present and a different value, shown on meter $M_1$, occurring when a defect is located. While separate vacuum tubes have been illustrated for each detector coil unit, tubes with several grids, each connected to a coil unit, may, if desired, be used.

It will be understood that the detector coils used with the arrangements of Figures 26, 27 and 28 may be single units or pairs of units arranged in series-opposed connection and may be either of the flat or perpendicular type described above. They may be arranged internally or exteriorly of the article to be tested and in radially spaced or tandem or other desired relation.

By means of the arrangement illustrated in Figure 26 the entire circumference of the article to be tested may be explored at one time and the presence of a defect in any short circumferential part of the article will result in a flow of current in the circuit which will be indicated on the indicating apparatus. Since the location of a defect in any transverse plane of the article is usually sufficient for all practical purposes, the exact location of the defect circumferentially of the article need not be determined. Obviously if a defect occurs anywhere in the circumference of a short axial length of the article, that length must be discarded or repaired.

In Figures 29 and 29A we have diagrammatically illustrated the affect of a longitudinally extending flaw 40 on the circumferentially flowing current which is induced in the tube 1 under test. The lines 41 may be considered to indicate the path of the current around the tube showing how it is diverted by the flaw 40. The inductive portion 42 of a detector circuit is shown as disposed substantially at right angles to the longitudinal axis of the flaw 40. As has been noted before the length of the detector circuit which is in inductive relation with the article is preferably kept relatively short and may advantageously have about the same length as the type of flaw which it is desired to detect. It will be seen that when the inductive portion 42 of the detector circuit is in the position shown in Figure 29 a different E. M. F. will be induced therein than would be induced if the inductive part 42 was disposed adjacent to a portion of the tube 1 in which the normal, undiverted, induced current was flowing. The change produced in the detector circuit by a flaw will be very much greater with our detector coil arrangements than would be caused by a coil completely surrounding the tube in a transverse plane.

From the foregoing description it will be understood that whatever may be the form of the inductive part of the detector circuit which is located close to the defect-containing part of the article under test, i. e. whether this part be simply part of a single conductor or a loop or series of coils, such part should be closely coupled in the maximum inductive position with respect to that part of the article.

Preferably the inductive part of the detector circuit should be fixed relative to the article except for movement of the article in one direction and also fixed relative to the primary or exciting coils. This may be readily accomplished by mounting the primary coils and detector circuit in a fixed position and using rollers with fixed axes or other suitable guides or locating means, for example, as shown in Figures 3 or 8, for directing the article past the primary and detecting coils in proper relation thereto.

While the detector coils illustrated hereinabove are relatively short as compared with the circumferential length of the article, it is to be understood that they may be of considerably greater circumferential length but they preferably should not exceed about 180° circumferentially of the article.

Although the flaw detecting apparatus and method has been described above particularly as applied to tubular or cylindrical articles, and although the drawings illustrate the application of our invention only to such articles, our improved testing method may readily be adapted to detect flaws in irregular articles or articles which are not of round or tubular cross-section. The energizing current need not be passed circumferentially around an article but might be passed in an axial direction when it is desired to detect certain types of flaws.

In practicing our invention we have found that when alternating current is used to induce current in the article to be tested, such alternating current may be of a frequency varying through a wide range. Frequencies as high as 1000 cycles have been successfully used as have also frequencies as low as the 30 cycle current. For determining certain types of defects it appears that relatively high frequencies are desirable. Also where the articles being tested are passed through the testing apparatus at high speeds higher frequencies than would otherwise be required have been found to be desirable. However, in certain types of articles it may be necessary to use relatively low frequency and we do not wish to be limited to any particular frequency range.

While it is unnecessary, in many cases in practicing the present invention, to saturate the article magnetically, it may be substantially saturated after the manner and by the means shown in co-pending application Serial No. 589,887 and described and claimed in United States Letters Patent No. 2,065,379 to Knerr and Farrow, where direct current coils surround the article and the exciting and test coils and conduct direct current sufficient in amount substantially to saturate the article magnetically.

Having thus described a number of embodiments of apparatus adapted to carry out our improved method of detecting flaws or defects in metal articles, we claim as our invention:

We claim:

1. The method of detecting small defects in metal articles which includes the steps of positioning a short length only of a conductor in closely coupled inductive relation to the part of the article to be examined for defects and at substantially right angles to the longitudinal axis of the defect, causing varying current to flow in the article in a direction substantially at right angles to the longitudinal axis of the defect, and detecting the defect by indicating defect caused variations in E. M. F. induced in the inductive part of the conductor.

2. The method of detecting small defects in metal articles which includes the steps of positioning parts of each of a pair of coils connected in series-opposed relation in closely coupled inductive relation to the article to be examined for defects and at substantially right angles to the longitudinal axis of the defect, causing varying current to flow in the article in a direction substantially at right angles to the longitudinal axis of the defect, and detecting the defect by indicating defect caused unbalancing of the opposed E. M. F.'s induced in said parts of the coils.

3. The method of testing electrically conductive articles for defects which comprises causing varying current to flow in the article transversely of the direction of extent of defects to be detected, locating said article with respect to a short length of an electrical conductor so that only said short length of the conductor is in maximum inductive relation to said article, moving said article and short length of conductor relatively and indicating changes in the induced current in said conductor created by defect caused variations in the current flowing in the article in the immediate vicinity of a defect.

4. The method of testing electrically conductive articles for defects which comprises causing varying current to flow in the article transversely of the direction of extent of defects to be detected, locating said article with respect to a short length of an electrical conductor so that only said short length of the conductor is in maximum inductive relation to said article, and indicating changes in the induced current in said conductor created by defect caused variations in the current flowing in the article in the immediate vicinity of a defect.

5. The method of testing electrically conductive articles for defects which includes the steps of establishing in fixed relation to each other means for creating a varying circumferentially flowing current in an axially short length of a moving elongated article and a closed electrical circuit having a short length in maximum inductive relation to the current created in said axially short length of the article whereby the varying current in said article will induce an electrical current in said closed circuit which will be substantially constant when said short length of said closed circuit is adjacent regions of said article free from defects and will be varied from said constant value when said short length of said closed circuit is adjacent a defect, relatively moving said article and short length of said circuit whereby a relatively narrow axially extending portion of said elongated article may be tested, and detecting the presence of defects in said narrow portion of said article by indicating variations or changes in the induced current in said closed circuit.

6. The method of testing electrically conductive articles for defects which includes the steps of establishing in fixed relation to each other means for creating a varying circumferentially flowing current in an axially short length of a moving elongated article and a closed electrical circuit having a short length in maximum inductive relation to the current created in said axially short length of the article whereby the varying current in said article will induce an electrical current in said closed circuit which will be substantially constant when said short length of said closed circuit is adjacent regions of said article free from defects and will be varied from said constant value when said short length of said closed circuit is adjacent a defect, and detecting the presence of defects in said narrow portion of said article by indicating variations or changes in the induced current in said closed circuit.

7. The method of testing electrically conductive articles for defects which includes the steps of creating a varying magnetic field thereby creating a flow of current circumferentially in an axially short portion of an elongated electrically conductive article, bringing an electrically conductive coil into inductive relation with said article with one side of the coil disposed in maximum inductive relation to the article and the remainder of the coil disposed in less inductive relation to the article, and determining the presence and position of defects in the article by indicating variations in E. M. F. in said coil created by defect caused variations in the current flowing circumferentially in the article in the immediate vicinity of a defect.

8. The method of testing an electrically conductive article for defects which includes the steps of causing a varying electrical current to flow in the article, bringing a short length of an electrical conductor forming a closed circuit into inductive relation with that portion of the article in which said varying current is flowing, said short length of said conductor extending substantially parallel to the direction of flow of said varying current in said article and being in substantially maximum inductive relation to said article, and locating defects in said article by indicating changes in the E. M. F. or current induced in said conductor which variations are caused by defect caused changes in the current flowing in the article in the immediate vicinity of a defect.

9. The method of detecting defects in an electrically conductive article which includes the steps of causing a varying electrical current to flow in the article, traversing the surface of the article with a conductor while maintaining a relatively short part only thereof in closely coupled inductive relation to the article, indicating the E. M. F. induced in said conductor by the varying current in the article and determining the presence and position of defects from variations occurring in said induced E. M. F. when said part of said conductor is adjacent a localized small portion of the article containing a defect.

10. The method of detecting defects in an electrically conductive article which includes the steps of causing a varying electrical current to flow in the article and indicating changes in E. M. F. induced by said varying current in a relatively short part of a conductor when said part only is positioned adjacent different localized small surface areas of the article.

11. In apparatus for the non-destructive testing of metallic articles, an electrical conductor arranged to encircle the article to be tested, a source of alternating electrical current connected to said conductor, means for causing relative movement of said article and the field created by said conductor, and flaw detector means disposed in fixed relation to said alternating current carrying conductor and in inductive relation to said article, said detector means including a closed electrical circuit having only a short portion thereof disposed in maximum inductive relation to said article and means for indicating variations in the E. M. F. induced in said closed circuit.

12. In apparatus for the non-destructive testing of metallic articles, an electrical conductor arranged to encircle the article to be tested, a source of alternating electrical current connected to said conductor, means for causing relative movement of said article and the field created by said conductor, and flaw detector means disposed in fixed relation to said alternating current carrying conductor and in inductive relation to said article, said detector means including a closed electrical circuit having only a short portion thereof disposed in maximum inductive relation to said article, said short portion extending substantially parallel to the direction of flow of the current induced in the article by said alternating current carrying conductor.

13. In apparatus for the non-destructive testing of metallic articles, the combination of means for causing a varying electrical current to flow in the portion of the article to be tested in a direction substantially at right angles to the direction of extent of flaws to be detected, a detector circuit having a relatively short portion thereof maintained in maximum inductive relation to the article, said short portion extending in a direction substantially parallel to the direction of flow of current in the article, and means for indicating defect caused changes in the current induced in said detector circuit.

14. In apparatus for the non-destructive testing of metallic articles, the combination of means for causing a varying electrical current to flow in the portion of the article to be tested in a direction substantially at right angles to the direction of extent of flaws to be detected, a detector circuit having a relatively short portion thereof maintained in maximum inductive relation to the article, said short portion extending in a direction substantially parallel to the direction of flow of current in the article, means for indicating defect caused changes in the current induced in said detector circuit, and means for causing relative movement of said article and said short portion of said detector circuit.

15. In apparatus for the non-destructive testing of metallic articles, the combination of means for causing a varying electrical current to flow in the portion of the article to be tested in a direction substantially at right angles to the direction of extent of flaws to be detected, and a detector circuit including a pair of detector coils connected in series-opposed relation in said circuit, said coils being spaced circumferentially of the article and having a part only of each coil disposed in maximum inductive relation to the article.

16. In apparatus for the non-destructive testing of metallic articles, the combination of means for causing a varying electrical current to flow in the portion of the article to be tested in a direction substantially at right angles to the direction of extent of flaws to be detected, and a detector circuit including a pair of detector coils connected in series-opposed relation in said circuit, said coils being spaced circumferentially of the article and having a part only of each coil disposed in maximum inductive relation to the article, and means for indicating defect caused variations in the E. M. F. induced in said detector coils.

17. In apparatus for the non-destructive testing of metallic articles, the combination of means for causing a varying electrical current to flow in the portion of the article to be tested in a direction substantially at right angles to the direction of extent of flaws to be detected, a detector circuit including a pair of detector coils connected in series-opposed relation in said circuit, said coils being spaced circumferentially of the article and having one side only of each coil disposed in maximum inductive relation to the article, and means for indicating defect caused variations in the E. M. F. induced in said detector coils, and means for causing relative movement of said article and said detector coils.

18. In combination in apparatus for testing elongated metallic articles for defects, a pair of spaced energizing coils arranged to permit the passage of an elongated article axially therethrough, electrical connections between said coils and a source of alternating current, a pair of relatively small detector coils connected in series-opposed relation and disposed in inductive relation to said article and spaced peripherally thereof between said energizing coils, and means for indicating variations in E. M. F. induced in either of said detector coils.

19. In combination in apparatus for testing elongated metallic articles for defects, a pair of spaced energizing coils arranged to permit the passage of an elongated article axially therethrough, electrical connections between said coils and a source of alternating current, a pair of relatively small detector coils connected in series-opposed relation and disposed in inductive relation to said article and spaced peripherally thereof between said energizing coils, each of said coils having an inductive part extending substantially parallel to the surface of the article being tested in a direction substantially parallel to the direction of flow of current induced in said article by said energizing coils, and means for indicating variations in E. M. F. induced in either of said detector coils.

20. In combination in apparatus for testing elongated metallic articles for defects, a pair of spaced energizing coils arranged to permit the passage of an elongated article axially therethrough, electrical connections between said coils and a source of alternating current, a pair of relatively small detector coils connected in series-opposed relation and disposed in inductive relation to said article and spaced peripherally thereof between said energizing coils, each of said coils having a portion extending substantially parallel to the surface of the article being tested in a direction substantially parallel to the direction of flow of current induced in said article by said energizing coils, means for indicating variations in E. M. F. induced in either of said detector coils, and means for causing relative movement of said article and said energizing and detecting coils.

21. In combination in apparatus for testing elongated metallic articles for defects, a pair of spaced energizing coils arranged to permit the passage of an elongated article axially therethrough, electrical connections between said coils and a source of alternating current, a plurality of relatively small detector coils disposed in inductive relation to said article and disposed peripherally entirely therearound between said energizing coils, each of said detector coils having a portion extending substantially parallel to the surface of the article being tested in a direction substantially parallel to the direction of flow of current induced in said article by said energizing coils, means for indicating variations in current induced in said detector coils, and means for causing relative movement of said article and said energizing and detecting coils.

22. In combination in apparatus for testing elongated metallic articles for defects, a pair of spaced energizing coils arranged to permit the passage of an elongated article axially therethrough, electrical connections between said coils and a source of alternating current, a plurality of relatively small detector coils disposed in inductive relation to said article and disposed peripherally entirely therearound between said energizing coils, each of said detector coils having a portion extending substantially parallel to the surface of the article being tested in a direction substantially parallel to the direction of flow of current induced in said article by said energizing coils, means for indicating variations in current induced in any one of said detector coils, and means for causing relative movement of said article and said energizing and detecting coils.

23. In apparatus of the type described for testing elongated metal articles, a set of detector coils circumferentially arranged to permit the passage of the article to be tested therethrough, a second set of detector coils axially spaced from said first named set and arranged similarly to said first named set but having its individual coils staggered circumferentially relative to the coils of said first named set.

24. In apparatus for detecting defects in electrically conductive articles, means for causing an alternating current to flow in the article, a plurality of detector coils each arranged with a part in inductive relation to the article, means for connecting said coils in parallel and to an indicating device, and rectifying units between said coils and the parallel connections therebetween whereby any increase in E. M. F. in a coil is transmitted directly to said indicating device without being impressed upon the other coils.

HORACE C. KNERR.
ALFRED R. SHARPLES.